United States Patent
Chevaux

(10) Patent No.: US 9,776,366 B2
(45) Date of Patent: Oct. 3, 2017

(54) TOOL FOR POSITIONING A STRIP FOR PRODUCING A TIRE BLANK

(75) Inventor: Nicolas Chevaux, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

(*) Notice: Subject to any disclaimer, the term of this patent is extended or adjusted under 35 U.S.C. 154(b) by 47 days.

(21) Appl. No.: 14/116,933

(22) PCT Filed: May 7, 2012

(86) PCT No.: PCT/FR2012/051012
§ 371 (c)(1),
(2), (4) Date: Feb. 18, 2014

(87) PCT Pub. No.: WO2012/153057
PCT Pub. Date: Nov. 15, 2012

(65) Prior Publication Data
US 2014/0174637 A1    Jun. 26, 2014

(30) Foreign Application Priority Data
May 10, 2011    (FR) ...................... 11 54011

(51) Int. Cl.
*B29D 30/16* (2006.01)
*B29D 30/00* (2006.01)
(Continued)

(52) U.S. Cl.
CPC ......... *B29D 30/00* (2013.01); *B29D 30/1628* (2013.01); *B29D 30/60* (2013.01);
(Continued)

(58) Field of Classification Search
CPC ............... B29D 30/14; B29D 30/1621; B29D 30/1628; B29D 30/1635; B29D 30/28;
(Continued)

(56) References Cited

U.S. PATENT DOCUMENTS

| 3,047,863 A * | 7/1962 | Bolie | G01S 3/42 248/183.1 |
| 3,790,002 A * | 2/1974 | Germond | B25J 9/04 414/4 |

(Continued)

FOREIGN PATENT DOCUMENTS

| EP | 0264600 A1 | 4/1988 |
| EP | 0410852 A1 | 1/2003 |

(Continued)

OTHER PUBLICATIONS

Machine generated English language translation of JP 2010-162704 (original document dated Jul. 2010).*

(Continued)

*Primary Examiner* — Martin Rogers
(74) *Attorney, Agent, or Firm* — Dickinson Wright PLLC

(57) ABSTRACT

The tool which contains:
  a support, and
  an arm bearing a strip extrusion member and a strip applicator roller, wherein the arm is articulated with respect to the support about a first axis parallel to a geometric axis of the roller and about a second axis tangential to a circumference of the roller, of the first and second axes at least one passing through a centre of gravity of the arm.

4 Claims, 3 Drawing Sheets

(51) Int. Cl.
    *B29D 30/62* (2006.01)
    *B29D 30/60* (2006.01)
    *B29L 30/00* (2006.01)
    *B29C 47/00* (2006.01)
    *B29C 47/02* (2006.01)
    *B29C 47/08* (2006.01)
    *B29K 21/00* (2006.01)

(52) U.S. Cl.
    CPC .......... *B29D 30/62* (2013.01); *B29C 47/0021* (2013.01); *B29C 47/026* (2013.01); *B29C 47/0866* (2013.01); *B29K 2021/00* (2013.01); *B29L 2030/00* (2013.01)

(58) Field of Classification Search
    CPC ............ B29D 30/3021; B29D 30/3028; B29D 30/3035; B29D 30/60
    See application file for complete search history.

(56) References Cited

U.S. PATENT DOCUMENTS

| | | | | |
|---|---|---|---|---|
| 4,927,482 A * | 5/1990 | Capelle | ................. | B29C 43/224 156/243 |
| 5,221,406 A * | 6/1993 | Laurent | ........................ | 156/397 |
| 5,325,754 A * | 7/1994 | Pohl | ........................ | B26D 3/003 83/488 |
| 5,751,078 A * | 5/1998 | Loewenthal | ............. | B64G 1/22 244/165 |
| 5,865,576 A * | 2/1999 | Arai | ..................... | B23Q 1/5462 219/121.67 |
| 2001/0042586 A1 | 11/2001 | Caretta et al. | | |
| 2007/0199661 A1* | 8/2007 | Nicolas | ............... | B29C 47/0021 156/361 |
| 2008/0251185 A1* | 10/2008 | Cappa | ................. | B29C 47/0019 156/117 |
| 2009/0025857 A1* | 1/2009 | Marangoni | ............ | B29D 30/30 156/130 |
| 2009/0223637 A1* | 9/2009 | Marangoni | ............ | B29D 30/16 156/406.4 |
| 2010/0043948 A1* | 2/2010 | Mizota | ............... | B29D 30/1621 156/117 |
| 2011/0146874 A1* | 6/2011 | Losey | .................... | B29D 30/16 152/526 |
| 2012/0118299 A1* | 5/2012 | Miller | ................... | A61F 5/3792 128/870 |

FOREIGN PATENT DOCUMENTS

| | | | | |
|---|---|---|---|---|
| EP | 1279486 A2 | 1/2003 | | |
| EP | 1815971 A1 | 8/2007 | | |
| JP | H1148363 | 2/1999 | | |
| JP | 2003-33976 | * 2/2003 | ............ | B29D 30/08 |
| JP | 2004136549 | 5/2004 | | |
| JP | 2010-162704 | * 7/2010 | ............ | B29D 30/60 |
| WO | 02081180 A1 | 10/2002 | | |

OTHER PUBLICATIONS

Machine generated English language translation of JP 2003-33976 (original document dated Feb. 2003).*
PCT/FR2012/051012, International Search Report (English translation included), dated Sep. 5, 2012, 3 pages.
Office Action in corresponding Chinese Patent Application No. 2012800222359.8 dated Mar. 16, 2015.

* cited by examiner

TOOL FOR POSITIONING A STRIP FOR PRODUCING A TIRE BLANK This application claims benefit of the filing date of PCT/FR2012/051012, filed May 7, 2012, which claims the benefit of FR1154011, filed May 10, 2011, the entire contents of each of which are incorporated herein by reference for all purposes.

BACKGROUND

1. Field

The invention relates to the creation of green tire blanks by winding strips onto a member exhibiting symmetry of revolution.

2. Description of Related Art

Document EP-0 264 600 discloses a device for creating a green tire blank which comprises a rotary drum and a tool having an arm able by extrusion to produce a strip and wind it onto the drum. The arm is articulated to its support about an axis parallel to the axis of rotation of the drum. Thus, the arm can adapt its position in the direction radial to the axis of the drum in order to move closer or further away to account for irregularities in the shape of the drum or of the winding already laid and also in order to follow the increase in diameter of the green tire blank caused by the build-up of the layers of strip already laid.

In addition, the arm is able to move in rotation with respect to the support about an axis parallel to the longitudinal direction of the arm so that the orientation of the strip can be adapted to its position on the tire, for example on the sidewalls of the green tire blank or alternatively so that it can be superposed in full or in part with one or more layers of strip already laid.

The arm is also mounted with the ability to slide so that it can travel across the entire width of the green tire blank.

When the strip is being wound, the arm applies to it an application force in order to cause it to stick to the layers of strip already wound. However, the weight of the arm, which bears the extrusion means and sometimes even drive means, applies an additional force to the strip. This force has little adverse consequence when the cross section of the strip has its largest dimension parallel to the axis of rotation of the drum. By contrast, it does have adverse consequences when the strip is laid in a position that is inclined with respect to that axis.

This is because the application force and the effect of gravity, in such a case, are not parallel and their resultant therefore has a component parallel to the axis of rotation of the drum. This can deform or harm the strip as it is being laid.

In addition, the degree of precision usually required for positioning the strip on the green tire blank is of the order of one tenth of a millimetre.

Reducing the cycle times involved in manufacturing such a green tire blank means that the speed at which the receiving surface rotates and the strip feed rate are speeded up. The receiving surface on which the green tire blank is built is a surface of revolution which may have a cylindrical or toroidal overall shape.

In order to adapt the position of the strip it is therefore desirable to be able to make the arm pivot about the centre of the strip at a high angular acceleration.

Now, since the mass carried by the arm is itself high, the moment of inertia of the arm about this axis may reach values that are not insignificant.

Bearing in mind the desired acceleration values, the resistive torque that appears as the arm rotates may have a significant effect on the mechanical forces on the axes.

Now, the technologies that allow such a torque to be transmitted have two significant disadvantages. They generate a high bulk and they substantially increase the overall mass of the device. Further, if assembly clearances that are small enough to be compatible with the installation are desired, the additional costs involved are great.

SUMMARY

One objective of the disclosure is to make it easier to create green tire blanks by winding a strip onto a member exhibiting symmetry of revolution, notably with regard to at least one of these two problem sets.

To this end, the invention provides a tool for laying a strip for producing a green tire blank, which comprises:
  a support, and
  an arm bearing a strip extrusion member and a strip applicator roller,
the arm being articulated with respect to the support about a first axis parallel to a geometric axis of the roller and about a second axis tangential to a circumference of the roller, of the first and second axes at least one passing through a centre of gravity of the arm.

Advantageously, the first axis passes through the centre of gravity.

This then gets away from the effect of the weight of the arm on the strip as it is being wound onto the receiving surface. The application force applied by the arm to the strip is therefore only that obtained by the means specifically provided for this purpose and the aforementioned unwanted resultant disappears. This then avoids the generation on the strip of the unwanted deformations likely to harm it.

It also becomes easier to modify this application force at any moment and to adapt it to the speed at which the strip is travelling or the rheological state of the material of which it is made.

In addition, it is particularly advantageous to be able to adapt the rollering pressure to suit the speed of travel because the time/application pressure compromise is no longer the same when the speed changes. What happens is that the strip jointing time is far shorter at high speed than it is at low speed. It is therefore necessary to increase the application pressure at high speed. Now, when this is done, given the geometric imperfections in the support or in the winding already performed, the tool experiences excitations the magnitude of which increases as the laying rate increases. This causes the value of the application pressure to fluctuate. It is therefore advantageous to be able to increase this pressure in order to stiffen the arm and make it less sensitive to the excitations caused by passage over imperfections on the receiving surface. Conversely, the application pressure used at high speed cannot be used at low speed because it would damage the product. Here again, it is therefore advantageous to be able to adapt the pressure to suit.

Advantageously, the second axis passes through the centre of gravity of the arm.

This measure makes it possible to reduce the moment of inertia of the arm with respect to this axis. The resistive torque of the arm as it is manoeuvring is therefore reduced accordingly. It is therefore possible to reduce the bulk and mass of the means intended to supply it. It thus becomes easier to obtain the levels of clearance desired. In addition, this position of the centre of gravity eliminates the radial forces that were generated by centripetal force. The loads to which the means guiding the rotation about this axis are subjected are therefore reduced. It is therefore also as a result possible to make these means lighter, reducing their size and increasing their degree of precision.

For preference, the first and second axes pass through the centre of gravity of the arm.

Thus, by combining these two features, the advantages thereof are combined.

The tool according to an embodiment of the invention may further have at least any one of the following features:
the tool comprises a bracket,
the arm is articulated to the bracket about the first axis,
the bracket is articulated to the support about the second axis,
the arm is mounted such that it can slide with respect to the support in at least one of the following directions: a direction parallel to a geometric axis of the roller; and two directions perpendicular to the latter and perpendicular to each other, and preferably in each of these directions,
the arm is articulated to the cradle about the first and second axes,
the cradle is mounted such that it can slide with respect to the support in the direction or directions,
the support bears the cradle, and
the cradle bears the bracket.

The invention also provides a device for producing a green tire blank which comprises a receiver exhibiting symmetry of revolution and at least one tool according to an embodiment of the invention able to lay a strip on the receiver.

Advantageously, the device comprises at least two tools able to lay strips on the same receiver.

This is because increasing the number of tools associated with one and the same receiving surface makes it possible to accelerate the green tire blank production rate.

The invention also provides a method for creating a green tire blank in which at least one arm produces a strip by extrusion and a roller of the arm applies that strip to a receiver exhibiting symmetry of revolution, the arm pivoting with respect to a support of the arm about a first axis parallel to a geometric axis of the roller and about a second axis tangential to a circumference of the roller, of the first and second axes, at least one passing through a centre of gravity of the arm.

BRIEF DESCRIPTION OF DRAWINGS

Further features and advantages of the invention will become apparent from the following description of one embodiment given by way of nonlimiting example, with reference to the attached drawings in which.

DETAILED DESCRIPTION OF SPECIFIC EMBODIMENTS

Figure 1:
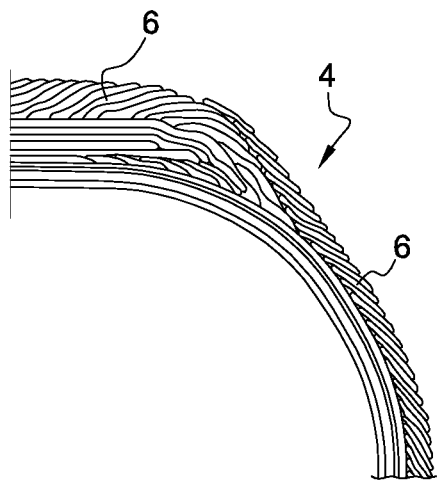
FIG. 1 is a partial view in axial section of a green tire blank produced by means of the invention.
Figure 2:
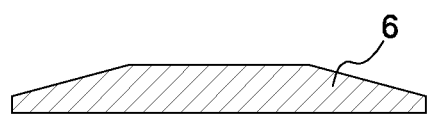
FIG. 2 is a view in cross section of a strip manufactured during the implementation of the invention.
Figure 4:
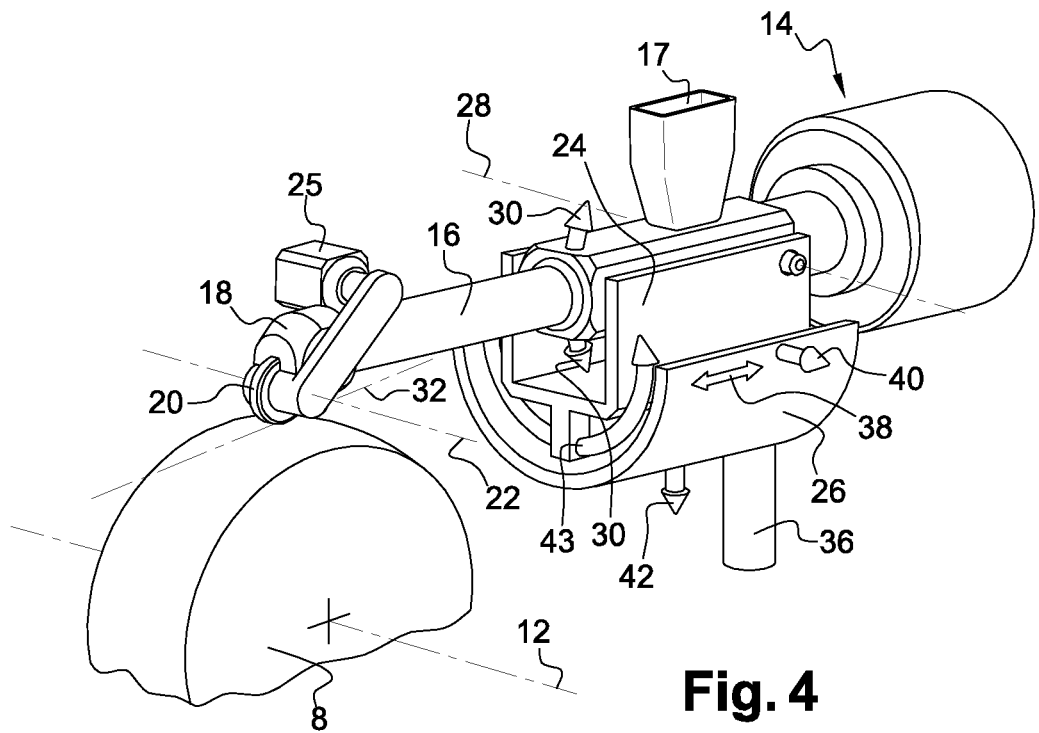
FIG. 4 is a perspective view of detail D of FIG. 3.

FIGS. 3 to 10 illustrate an installation 2 according to an embodiment of the invention for creating a green tire blank 4 like the one illustrated in FIG. 1, this embodiment involving extruding and winding a strip 6 of which the cross section in a plane perpendicular to its longitudinal direction has been illustrated in FIG. 2.

The installation 2 comprises a receiver 8 carried by a support 10 of the installation and mounted with the ability to rotate with respect to this support. The receiver 8 has a cylindrical annular or toroidal overall shape with symmetry of revolution about a horizontal axis 12 which corresponds to its axis of rotation. Its circumferential external face forms a receiving surface for the strip. It forms, for example, a drum.

Figure 3:
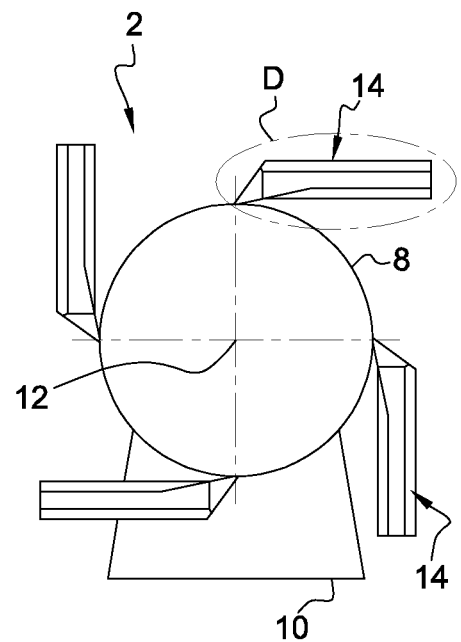
FIG. 3 is a general arrangement of an installation according to one embodiment of the invention.

The installation 2 comprises at least one tool 14 for producing and laying the strip 6. In this particular instance, the installation comprises several tools 14, of which there are four here. The tools are, for example, set out as illustrated in FIG. 3 evenly distributed about the axis 12 and in such a way that a distal end of each tool comes into contact with the circumferential face of the receiver. In what follows, we shall describe the tool 14 that comes into contact with the receiving surface of the receiver 8 and which is situated in the 12 o'clock position.

The tool 14 comprises an arm 16 having an elongate rectilinear overall shape, the longitudinal direction of the arm being parallel to the direction tangential to the circumferential direction of the receiving surface, this tangential direction being perpendicular to the axis 12. The arm 16 in a central portion bears a member 17 for introducing the component ingredients of the rubber. At its distal end it comprises a member 18 for extruding the rubber strip 6, the member in this instance being formed by a roller tip 20. The roller is mounted with the ability to rotate with respect to the body of the arm about an axis 22 that coincides with the main geometric axis of the roller and is parallel to the axis 12 of the member 8. The arm bears drive means 25 able to rotate the roller about its axis.

In a way that is known per se and will not be detailed here, the material introduced through the member 17 travels along inside the arm and is extruded via the roller tip in the form of the strip 6. The strip is applied to the circumferential face of the roller 20 then transferred onto that of the receiving surface of the receiver 8 or alternatively onto the layers of strip already wound thereon. For further details on this matter, reference may be made to, for example, the aforementioned document EP-0 264 600.

The tool 14 comprises an internal cradle, here forming a bracket 24, bearing the arm 16, and an external cradle 26 bearing the bracket 24 and itself borne by the support 10.

The bracket 24 has a U-section profiled overall shape, open at the top. This then forms a cavity into which the arm 16 extends, the arm emerging at the two longitudinal ends of the cavity. The arm 16 is articulated to the bracket 24 about a horizontal axis 28 parallel to the axis 22 and here referred to as the compliance axis. Articulation is achieved for example by means of a shaft passing through the arm and passing right through the walls of the bracket. This rotational mobility allows the roller 20 to be moved towards or away from the axis 12 as illustrated by the arrows 30.

The external cradle 26 is in the overall shape of a half-cylinder, its cross section being in the form of an arc of a circle, open at the top. It forms a cavity in which the bracket 24 is housed.

The bracket 24 is mounted with the ability to move rotationally with respect to the external cradle 26 about an axis 32 in this instance referred to as the alpha axis. This axis is perpendicular to the axes 12 and 22, tangential to the circumferential faces of the roller 20 and of the receiver 8 and passes through the instantaneous point of contact between these. In this particular instance, the rotation of the bracket in the external cradle is guided and driven notably by means of an arc-shaped rack borne by the cradle and of a motor fitted with a pinion that meshes with the rack and is borne by the bracket.

Figure 5:
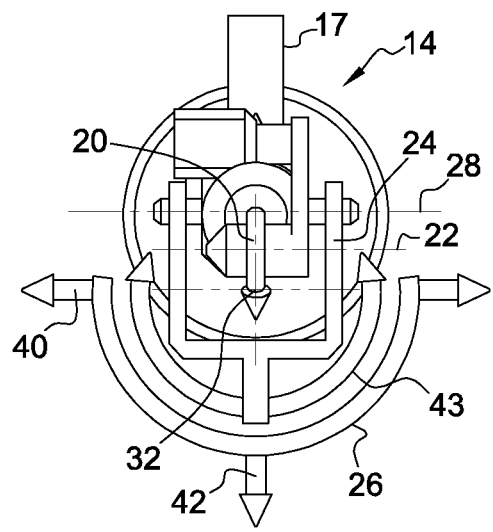
FIGS. 5 and 6 are two end-on views of the arm of FIG. 4 in two respective positions with respect to the support.
Figure 6:
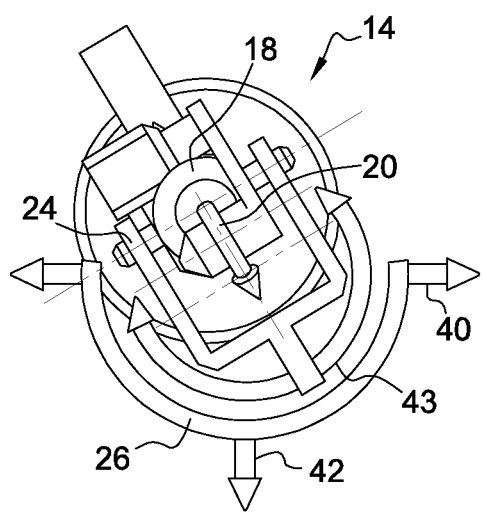
Figure 7:
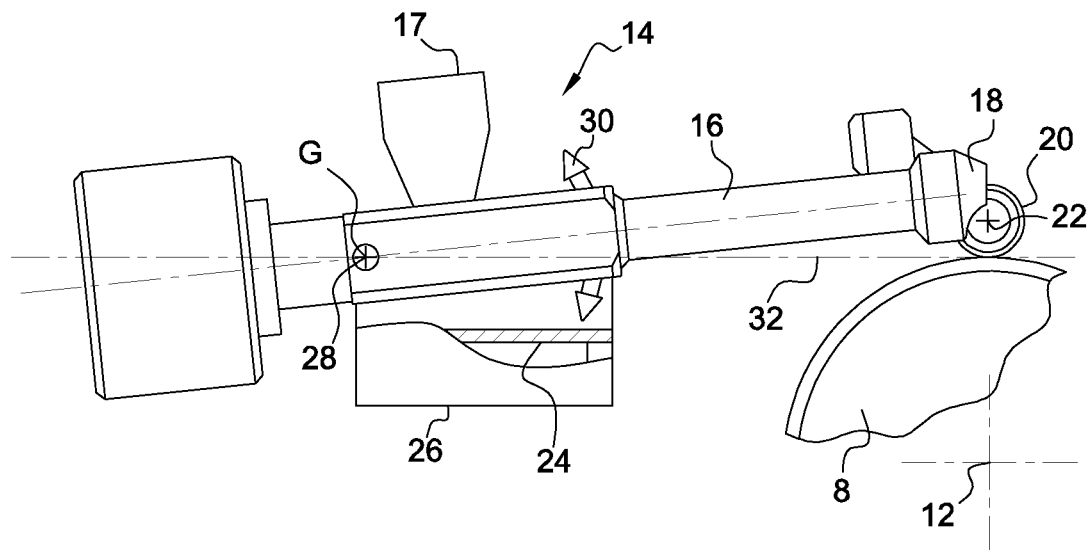
FIG. 7 is a side view of the arm and of the receiving surface of FIG. 4.

Thanks to this rotation about the alpha axis 32, the bracket and the arm can occupy a position illustrated in FIG. 5 in which the compliance axis 28 and the axis 22 of the roller are parallel to the axis of rotation 12 of the receiving surface, or a position illustrated for example in FIG. 6 in which these two axes are inclined with respect to the axis 12.

The arm is configured in such a way that the compliance axis 28 and the alpha axis 32 pass through the centre of gravity G of the arm which thus forms their point of intersection. It is the arm defined as forming the assembly housed in the bracket 24 and articulated thereto about the axis 28 that is referred to here. This assembly therefore notably comprises the members 17 and 18 and the means 25.

The external cradle 26 is connected to the support 10 by means 36 that make the cradle able to slide with respect to the support in the following three directions of sliding:
the direction 38 parallel to the longitudinal direction of the arm;
the horizontal direction 40 parallel to the axis 22, and
the direction 42 perpendicular to the previous two.

In the case of the upper tool 14 which is described here in detail, the first two directions are horizontal while the third is vertical.

The means 36 in this particular instance form part of a robot capable of making the arm 16 slide in the three directions 38, 40 and 42 with respect to the receiver 8 and of controlling pivoting about the alpha axis 32.

The tool 14 further comprises a force generating device able to press the roller 20 against the receiver 8 with a pressure radial to the axis 12 and of predetermined and adjustable magnitude. This device is, for example, a membrane-type pneumatic actuator.

The other tools 14 of the installation of FIG. 3 occupy, about the receiver 8, positions similar to those of the tool 14 that has just been described and which are the image thereof by a rotation of one quarter of a turn about the axis 12. In particular, two of the arms 16 are horizontal and the other two are vertical. These tools can be axially offset in order to avoid interference between the various stacks of strip.

In this particular instance, the green tire blank 4 is produced by means of the method of the invention as follows.

The receiver 8 rotates about its axis 12. Within each tool 14, the materials intended to form the rubber are introduced via the member 17 into the arm and then extruded at the tip 18 in the form of a strip 6 which is applied to the rotating roller 20 so that it can be positioned and wound on the circumferential face of the receiver 8. Certain layers of strip are applied directly to the receiving surface, while others are applied partly or wholly over layers wound before as shown by the cross section through the green tire blank illustrated in FIG. 1. The strip is used to form those parts of the green tire blank that will make up the tread and sidewalls of the tire.

During winding, the tool 14 applies a radial pressure of predetermined intensity to the strip by means of the roller 20. Because the compliance axis 28 passes through the centre of gravity G, this force is not accompanied by an unwanted force associated with the weight of the arm. The application force is mastered without the need to reduce the mass carried within the arm 16.

The compliance axis 28 allows the arm to follow any defects in the roundness of the receiving surface and of the green tire blank by allowing it to absorb these unevennesses. The main sources of unevenness are as follows:
the belt runout or out-of-round of the receiving surface, which is of a very small amplitude, of the order of one hundredth of a millimetre, and which is distributed over one turn;
passage over the start of the first turn. This has a high amplitude but is isolated in one spot and gradually disappears; and
non-circular geometry of the receiver that forms the receiving surface.

Figure 9:
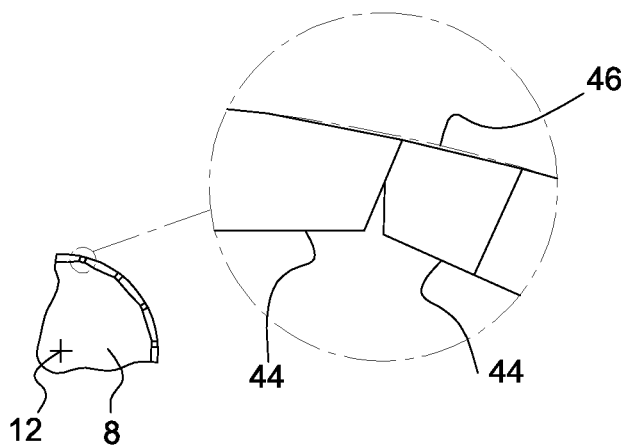
FIGS. 9 and 10 are views of the receiving surface of the installation of FIG. 3.
Figure 10:
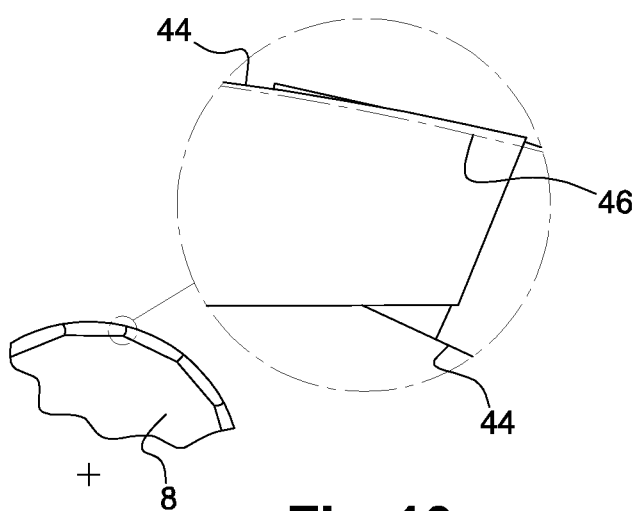

The amplitude of the latter defect is very small, of the order of one tenth of a millimetre, but it occurs at a high frequency, for example ten to fifteen times per revolution. This is because the receiving surface may comprise several segments following on from one another in the circumferential direction and mounted such that they can be moved so that the diameter of this surface can be tailored to suit that of the green tire blank being produced. The presence of these segments leads to irregularities in the cylinder that forms the circumferential face of the receiver 8. Such segments 44 have been illustrated in FIGS. 9 and 10. In FIG. 9, the junction between segments that follow on from one another in the circumferential direction leads to an underthickness effect at the passage from one segment to another. Conversely, in FIG. 10, the passage from one segment to another leads to an overthickness effect at the edges of the segments. In these two figures, the detail showing part of the receiving surface on a larger scale illustrates the shape of the segments and that of the theoretical circular cylindrical profile 46.

As the strip is being applied, the robot 36 causes the arm to slide in the directions 38, 40 and 42 and to rotate about the alpha axis 32 according to the desired orientation of the strip to be applied to the green tire blank and according to the region in which the strip is to be placed.

Figure 8:
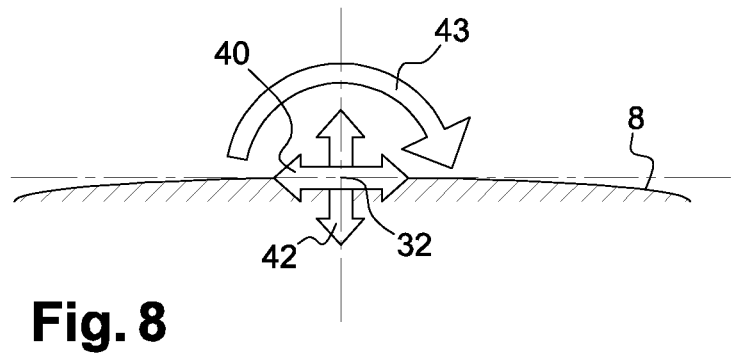
FIG. 8 illustrates the movements of the arm upon contact with the green tire blank when the invention is being implemented.

FIG. 8 notably illustrates the sliding of the arm in the directions 40 and 42 and, by means of the arrow 43, its pivoting about the axis 32. Because the alpha axis 32 passes through the centre of gravity G, the moment of inertia of the arm about this axis is modest and the forces needed to move the arm about this axis may remain of modest intensity.

In the present example, and as illustrated in FIG. 2, the cross section of the strip has a lens shape in the upper part formed by three facets and facing away from the receiver 8. The lower surface thereof is planar. It has, for example, a length of 16 mm and a height of 1.7 mm for a cross-sectional area of 22.25 mm$^2$, these values being nonlimiting. Other shapes of cross section are possible, for example a rectangular section, and all that is required in order to change this is a change in tip tooling.

In the remainder of the manufacture, the green tire blank once finished notably undergoes a step of curing in a press in order to vulcanize the rubber and obtain the tire.

The tire will, for example, be a road tire for a light vehicle, a passenger vehicle, a vehicle of the heavy goods vehicle type, of a utility vehicle or of a piece of construction plant.

The invention also allows the tools 14 to be positioned relative to the receiver 8 taking into consideration various constraints:

- the bulk of the installation 2 as a whole;
- the effect of gravity on the tools, which is precisely the constraint that is reduced to zero by virtue of the invention;
- the supply of material, and
- the ergonomics and safety of the machine.

Of course, numerous modifications could be made to the invention without departing from the scope thereof.

The invention claimed is:

1. Tool for laying a strip for producing a green tire blank comprising:
    a support,
    an arm bearing a strip extrusion member and a strip applicator roller, the arm being articulated with respect to the support about a first axis parallel to a rotational axis of the roller and about a second axis tangential to a circumference of the roller, the first and second axes passing through a center of gravity (G) of the arm, and
    a cradle, the cradle having a half-cylinder shape with its cross-section in the form of an arc of a circle, open at a top of the circle, with the opening forming a cavity, and the cradle bearing the arm via the cavity such that pivoting of the arm about the second axis occurs relative to the cradle and is guided by an arc-shaped rack borne by the cradle.

2. Tool according to claim 1, which comprises a bracket, the arm being articulated to the bracket about the first axis, the bracket being articulated to the support about the second axis.

3. Tool according to claim 1, wherein the arm is articulated to the cradle about the first and second axes and the cradle is mounted such that it can slide with respect to the support in
    a direction parallel to the axis of the roller, and
    two directions perpendicular to one another and the direction parallel to the axis of the roller.

4. Tool according to claim 1, wherein the support bears the cradle, and the cradle bears a bracket.

* * * * *